(12) United States Patent
Saurabh et al.

(10) Patent No.: US 8,660,895 B1
(45) Date of Patent: Feb. 25, 2014

(54) METHOD AND SYSTEM FOR RATING OF OUT-OF-HOME DIGITAL MEDIA NETWORK BASED ON AUTOMATIC MEASUREMENT

(75) Inventors: Varij Saurabh, State College, PA (US); Jeff Hershey, Norfolk, VA (US); Satish Mummareddy, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1405 days.

(21) Appl. No.: 11/818,485

(22) Filed: Jun. 14, 2007

(51) Int. Cl.
*G06Q 30/02* (2012.01)
(52) U.S. Cl.
CPC .................................. *G06Q 30/0204* (2013.01)
USPC ....................................................... 705/14.42
(58) Field of Classification Search
CPC .................................................. G06Q 30/0204
USPC ................................................. 705/14, 14.42
See application file for complete search history.

(56) References Cited

U.S. PATENT DOCUMENTS

| | | | | |
|---|---|---|---|---|
| 4,847,604 | A * | 7/1989 | Doyle | 345/180 |
| 5,450,122 | A | 9/1995 | Keene | |
| 5,544,052 | A * | 8/1996 | Fujita et al. | 702/5 |
| 5,550,928 | A | 8/1996 | Lu et al. | |
| 5,729,697 | A * | 3/1998 | Schkolnick et al. | 705/23 |
| 5,754,429 | A * | 5/1998 | Ishihara et al. | 701/468 |
| 5,771,307 | A | 6/1998 | Lu et al. | |
| 6,252,522 | B1 | 6/2001 | Hampton et al. | |
| 6,437,819 | B1 * | 8/2002 | Loveland | 348/143 |
| 6,563,423 | B2 * | 5/2003 | Smith | 340/572.1 |
| 6,647,548 | B1 | 11/2003 | Lu et al. | |
| 7,155,159 | B1 | 12/2006 | Weinblatt et al. | |
| 7,203,338 | B2 | 4/2007 | Ramaswamy et al. | |
| 7,319,479 | B1 * | 1/2008 | Crabtree et al. | 348/169 |
| 2002/0111146 | A1 * | 8/2002 | Fridman et al. | 455/99 |
| 2002/0111865 | A1 * | 8/2002 | Middleton et al. | 705/14 |
| 2004/0111454 | A1 * | 6/2004 | Sorensen | 708/200 |
| 2005/0021397 | A1 * | 1/2005 | Cui et al. | 705/14 |
| 2006/0010028 | A1 * | 1/2006 | Sorensen | 705/10 |
| 2006/0200378 | A1 * | 9/2006 | Sorensen | 705/10 |
| 2007/0156514 | A1 * | 7/2007 | Wright et al. | 705/14 |
| 2008/0235089 | A1 * | 9/2008 | Weyer et al. | 705/14 |
| 2009/0030780 | A1 * | 1/2009 | York et al. | 705/10 |

\* cited by examiner

*Primary Examiner* — John G Weiss
*Assistant Examiner* — Michael Stibley

(57) ABSTRACT

The present invention is a method and system for producing a set of ratings for out-of-home media based on the measurement of behavior patterns and demographics of the people in a digital media network. The present invention captures a plurality of input images of the people in the vicinity of sampled out-of-home media in a digital media network by a plurality of means for capturing images, and tracks each person. The present invention processes the plurality of input images in order to analyze the behavior and demographics of the people. The present invention aggregates the measurements for the behavior patterns and demographics of the people, analyzes the data, and extracts characteristic information based on the estimated parameters from the aggregated measurements. Finally, the present invention calculates a set of ratings based on the characteristic information. The plurality of computer vision technologies can comprise face detection, person tracking, body parts detection, and demographic classification of the people, on the captured visual information of the people in the vicinity of the out-of-home media.

16 Claims, 13 Drawing Sheets

| CATEGORY OF CLUSTERED SITES | NODE TYPE |
|---|---|
| CLUSTER CATEGORY 1 | NT1  NT2  NT3  NT4 |
| CLUSTER CATEGORY 2 | NT5  NT6  NT7 |
| CLUSTER CATEGORY 3 | NT8  NT9  NT10 |
| ⋮ | ⋮ |

162

| NODE TYPE | NODE CLUSTER CATEGORY, SITE, AND LOCATION | | |
|---|---|---|---|
| NT1 | [CAT1, SITE1, LOC1] | [CAT1, SITE2, LOC1] | |
| NT2 | [CAT1, SITE1, LOC2] | [CAT1, SITE2, LOC2] | [CAT1, SITE3, LOC2] |
| NT3 | [CAT1, SITE1, LOC3] | [CAT1, SITE3, LOC3] | |
| NT4 | [CAT1, SITE1, LOC4] | [CAT1, SITE2, LOC4] | [CAT1, SITE3, LOC4] |
| NT5 | [CAT2, SITE4, LOC5] | [CAT2, SITE5, LOC5] | |
| NT6 | [CAT2, SITE4, LOC6] | [CAT2, SITE5, LOC6] | |
| NT7 | [CAT2, SITE4, LOC7] | [CAT2, SITE5, LOC7] | |
| NT8 | [CAT3, SITE6, LOC8] | [CAT3, SITE7, LOC8] | |
| NT9 | [CAT3, SITE7, LOC9] | | |
| NT10 | [CAT3, SITE6, LOC10] | [CAT3, SITE7, LOC10] | |
| ⋮ | ⋮ | | |

METHOD AND SYSTEM FOR RATING OF OUT-OF-HOME DIGITAL MEDIA NETWORK BASED ON AUTOMATIC MEASUREMENT

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system to measure the audience and their engagement with the out-of-home media, based on the automatic measurement for behavior patterns and demographics of the people in the vicinity of the plurality of out-of-home media in a digital media network.

2. Background of the Invention

There have been prior attempts at audience measurement. None of them have attempted to use automated vision based technology. The relevant patent numbers are U.S. Pat. No. 6,647,548, U.S. Pat. No. 7,155,159, U.S. Pat. No. 6,252,522, U.S. Pat. No. 5,771,307, U.S. Pat. No. 5,550,928, U.S. Pat. No. 5,450,122, and U.S. Pat. No. 7,203,338.

U.S. Pat. No. 6,647,548 of Lu, et al. (hereinafter Lu U.S. Pat. No. 6,647,548) disclosed an audience measurement system, using radio frequency. The audience measurement system identifies a program, which is broadcasted from a signal source and to which a receiver is tuned. The members of the audience carry a device that receives ancillary signals broadcasted with the program/channel. The device receives and records the viewing patterns of the monitored audience.

U.S. Pat. No. 7,155,159 of Weinblatt, et al. (hereinafter Weinblatt) disclosed an audience surveying technique for identifying individual members of an audience listening to and/or watching a program broadcasted from a programming signal source. A stationary apparatus is operatively arranged at a reception location with a plurality of portable devices designed to be worn by the audience members. The stationary apparatus detects and stores a surveying code transmitted with the program, and it also periodically emits a trigger signal, which causes the portable devices to respond by emitting a unique identification signal pre-stored in each apparatus. The stationary apparatus also detects and stores the identification signals. By associating the detected surveying code with the detected identification signals, it is possible to quickly, accurately, and reliably identify the individual audience members tuned to a particular program.

U.S. Pat. No. 6,252,522 of Hampton, et al. (hereinafter Hampton) disclosed a billboard consumption measurement system for measuring exposure to a visual display such as a billboard. A transmitter that is proximate to the billboard broadcasts a data signal that carries information relating to the billboard. This information may identify the location of the billboard, the message displayed by the billboard, and time of day. The data signal is provided at a power level that is adapted to reach a predefined exposure area within which the billboard can be viewed. A portable receiving device is provided to a defined consumer population to measure the exposure of the consumers to the billboards. The receiving device may be carried or worn by the consumer, or carried in the consumer's vehicle. The receiving device is adapted to recover the data signal and store the information relating to the billboard when the viewer is within the predefined exposure area. The time of day and duration of the exposure may also be recorded. The recorded information is subsequently downloaded for processing by a central processing facility, e.g., via a telephone line or computer link.

U.S. Pat. No. 5,450,122 of Keene, et al. (hereinafter Keene) disclosed an in-station method and apparatus for encoding television programs, including commercials, with a digital identification code. The system aims to provide proof-of-play for programs and commercials broadcasted on television.

The above-mentioned methods and systems have one fundamental difference from our system—they measure the people carrying the measurement devices, whereas the present invention measures anyone coming into the vicinity of the media. Their sampling process is inefficient, and prone to error. The measurement provided by such systems is only as good as the panel of people carrying the device. If there are biases in the sample, then the final measurement will be skewed. By measuring every audience member present within an area, our system removes all these inaccuracies.

U.S. Pat. No. 5,771,307 of Lu, et al. (hereinafter Lu U.S. Pat. No. 5,771,307) and U.S. Pat. No. 5,550,928 of Lu, et al. (hereinafter Lu U.S. Pat. No. 5,550,928) disclosed an audience measurement system and method for television audience. Through the use of a passive identification apparatus for identifying a predetermined individual member of a television viewing audience in a monitored viewing area, a video image of a monitored viewing area is captured. The system attempts to identify particular members of the audience using facial recognition techniques.

U.S. Pat. No. 7,203,338 of Ramaswamy, et al. (hereinafter Ramaswamy) disclosed methods and apparatus to count people appearing in an image.

The above-mentioned patents describe the technical process of identifying and counting individual members of a television audience. Unlike these processes, which are focused on television, our process adapts the technology for out-of-home audience measurement. The present invention counts every individual and categorizes him or her into broad segments. The present invention also combines this data with other data streams, such as geo-demographic data, sales data, etc., to provide more detailed and accurate measurement.

SUMMARY

The present invention is a method and system for producing a set of ratings for out-of-home media based on the automatic measurement of behavior patterns and demographics of the people exposed to a digital media network.

A Preferred Embodiment

The processes for the measurement of the behavior patterns and demographics of the people are based on a novel usage of a plurality of computer vision technologies applied to a plurality of input images. It is an objective of the present invention to efficiently handle complex human behaviors and demographic analysis from video sources utilizing a plurality of computer vision technologies, such as person recognition and tracking, in a preferred embodiment.

The present invention captures a plurality of input images of the people in the vicinity of sampled out-of-home media in a digital media network by a plurality of means for capturing images, and tracks each person. Then, the present invention processes the plurality of input images in order to analyze the behavior and demographics of the people. The present invention aggregates the measurements of the behavior patterns and demographics of the people, analyzes the data, and extracts characteristic information based on the estimated parameters from the aggregated measurements. Finally, the present invention calculates a set of ratings based on the characteristic information.

In this exemplary embodiment of the present invention, the behavior patterns can comprise a sequence of visits or a combination of visits to a predefined area in the vicinity of the out-of-home media in a digital media network. The out-of-home media can comprise digital signage, posters, or banners. The digital media network can comprise a network of the physical spaces.

Behavior Analysis

The behavior analysis can comprise a path analysis as one of the behavior characterization methods. The present invention processes the plurality of input images in order to track each person in each field of view of the plurality of means for capturing images, and processes the path analysis for each person in the plurality of persons for the video-based behavior analysis based on the tracking in an exemplary embodiment.

The path analysis collects a plurality of trip information for each tracked person during a predefined window of time. In the embodiment of the present invention, the trip information can comprise attributes for initial point and destination, coordinates of the person's position, temporal attributes (such as trip time and trip length), and average velocity for each of the plurality of trips.

The present invention efficiently handles the joining of the plurality of tracks across the multiple fields of view of the plurality of means for capturing images, accounting for splits and merges, and finds the information for the trip of the person based on the processed results from the plurality of tracks.

Utilization of the dwell time of the people in a specific location in the vicinity of the out-of-home media and the comparison against predefined thresholds can be used as one of the exemplary criteria for defining a targeted behavior pattern.

Other examples of the output of the video-based behavior analysis can comprise a sequence of visits or a combination of visits to a predefined space in the vicinity of the out-of-home media by the plurality of persons.

Demographics

It is one of the objectives of the present invention to provide the automatic demographic composition measurement to facilitate the extraction of the characteristic information of the people.

The demographic classification and composition measurement of people in the vicinity of the out-of-home media is performed automatically based on a novel usage of a plurality of means for capturing images and a plurality of computer vision technologies on the captured visual information of the people in the vicinity of the out-of-home media. The plurality of computer vision technologies can comprise face detection, person tracking, body parts detection, and demographic classification of the people, on the captured visual information of the people in the vicinity of the out-of-home media.

Business Value Description

From the business point of view, the present invention is a method and system to measure the audience and their engagement with the out-of-home media. The method and system use a plurality of technologies to provide automated measurement of a number of people entering and leaving a given area (traffic) and the duration of time for which they were engaged with the media (engagement). This data is combined with other data sources, such as media player log, sales data, demographic information for a specified geography, and data from traditional research, to provide an accurate measurement of audience traffic, segmentation and engagement for a given media.

The objective of the present invention is to provide accurate audience measurement for out-of-home media. Out-of-home media is defined as any communication device used by advertisers to reach the audience present in a specified location. Some examples are in-store marketing, digital signage, mall based signage, and other public venues. Different locations attract different types of audiences and engage them differently. Accurate measurement of audience behavior and composition is necessary for advertisers and media planners to ascertain the value of a specific media in a specific location. For example, a media is considered valuable if it communicates with a large number of people belonging to a uniform demographic group.

Another objective of the invention is to provide targeted advertising. Targeted advertising can be done in two ways—real-time and gradual. For real-time advertising, the audience sensing device senses and characterizes the audience present in front of the screen, using a plurality of technologies. This information is sent to the device that controls the media, which plays the content targeted to the person(s) in front of the screen. For gradual targeting, the data collected over a period of time will be used to understand and model how the audience composition changes with time. The invention can provide an approximate prediction of the type of audience expected in the vicinity of the screen at any given time. The information will be used to dynamically change content to match the needs of the expected audience segment.

The present invention captures a plurality of input images of the persons in the vicinity of the media by a plurality of means for capturing images. The present invention processes the plurality of input images in order to count the number of people in those images. The present invention also measures the duration for which each person in the image watches the media.

The processes are based on a novel usage of a plurality of computer vision technologies to automatically analyze the visual characterization of the persons from the plurality of input images. The present invention processes the plurality of input images in order to count and segment a person in each field of view of the plurality of means for capturing images.

Another objective of the invention is to model the audience of the entire network of the media. The process for actual data collection will be done in a sample of locations where the media is present. The sample selection will be done to cover different types of locations based on geography, size, and audience demographics. The data is combined with other types of data, such as transaction data and demographic information for a particular geography, to build a model that characterizes the network of media. The model will estimate the number of people exposed to the content played on the network and the duration of time the viewers watched the media. It will also predict the future audience attracted by the network.

Another objective of the invention is to provide data that will make it possible for advertisers and media owners to determine the value of the media, and thus buy and sell advertising time on the network. The data generated by the model will be used to develop ratings relevant to advertising measurement, such as opportunity to see (OTS), gross rating points (GRP), cost per thousand gross impressions (CPM), engagement, and impression duration.

DRAWINGS

Figures

FIG. 9 shows an exemplary table for the category of clustered sites and an exemplary table for node type and information for the exemplary extrapolation process based on the clustering of the sites in an exemplary embodiment of the present invention.

DETAILED DESCRIPTION OF THE INVENTION

Figure 1:
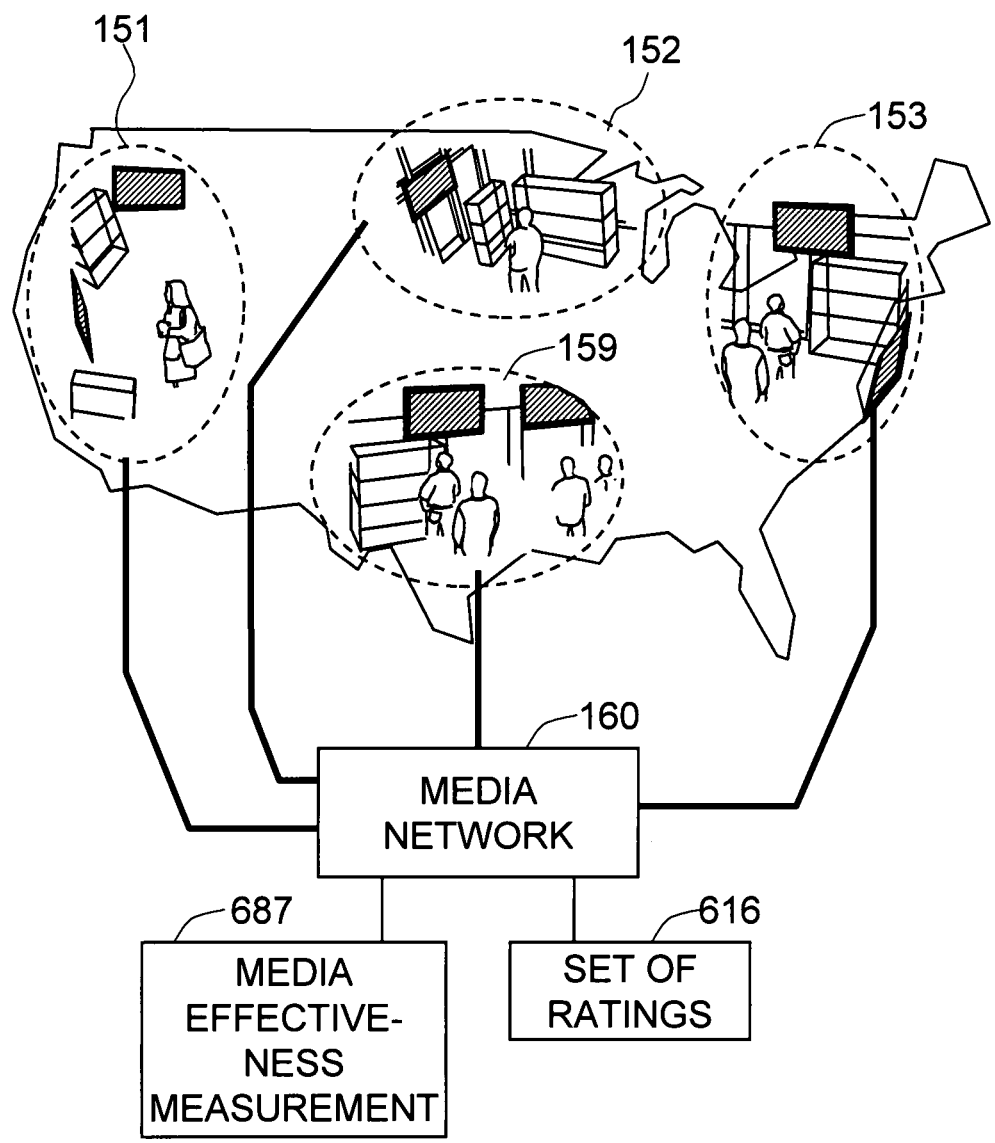
FIG. 1 shows an overview of an exemplary embodiment of the present invention, where the measurement of the audience and engagement of a plurality of out-of-home media are processed based on the automatic measurement of behavior patterns and demographics of the people in the vicinity of the plurality of out-of-home media in a network of the digital media.

FIG. 1 shows an overview of an exemplary embodiment of the present invention, where the measurement of the audience and engagement of the plurality of out-of-home media are processed, based on the automatic measurement for behavior patterns and demographics of the people in the vicinity of the plurality of out-of-home media in a network of the digital media.

The present invention is a method and system for producing a set of ratings for out-of-home media based on the automatic measurement for behavior patterns and demographics of the people in a network of digital media.

A Preferred Embodiment

The processes for the measurement of the behavior patterns and demographics of the people are based on a novel usage of a plurality of computer vision technologies applied to a plurality of input images. In an exemplary embodiment, the present invention can efficiently analyze complex human behaviors and demographic analysis from video sources utilizing a plurality of computer vision technologies, such as person recognition and tracking, in a preferred embodiment.

The present invention captures a plurality of input images of the people in the vicinity of sampled out-of-home media in a digital media network by a plurality of means for capturing images, and tracks each person. Then, the present invention processes the plurality of input images in order to analyze the behavior and demographics of the people. The present invention aggregates the measurements for the behavior patterns and demographics of the people, analyzes the data, and extracts characteristic information based on the estimated parameters from the aggregated measurements. Finally, the present invention calculates a set of ratings based on the characteristic information.

In this exemplary embodiment of the present invention, the behavior patterns can comprise a sequence of visits or a combination of visits to a predefined area in the vicinity of the out-of-home media in a digital media network. The out-of-home media can comprise digital signage, posters, or banners. The digital media network can comprise a network of the physical spaces.

Behavior Analysis

The behavior analysis can comprise a path analysis as one of the behavior characterization methods. The present invention processes the plurality of input images in order to track each person in each field of view of the plurality of means for capturing images, and processes the path analysis for each person in the plurality of persons for the video-based behavior analysis based on the tracking in an exemplary embodiment.

The path analysis collects a plurality of trip information for each tracked person during a predefined window of time. In the embodiment of the present invention, the trip information can comprise attributes for initial point and destination, coordinates of the person's position, temporal attributes (such as trip time and trip length), and average velocity for each of the plurality of trips.

The present invention processes a path analysis of each person among the people for the behavior analysis, where the attributes of the path analysis can comprise information for initial point and destination, global trip, time, and average velocity.

The present invention efficiently handles the joining of the plurality of tracks across the multiple fields of view of the plurality of means for capturing images, accounting for splits and merges, and finds the information for the trip of the person based on the processed results from the plurality of tracks.

Utilization of the dwell time of the people in a specific location in the vicinity of the out-of-home media and the comparison against predefined thresholds can be used as one of the exemplary criteria for defining a targeted behavior pattern.

Other examples of the output of the video-based behavior analysis can comprise a sequence of visits or a combination of visits to a predefined space in the vicinity of the out-of-home media by the plurality of people.

Demographics

In an exemplary embodiment, the present invention can provide the automatic demographic composition measurement to facilitate the extraction of the characteristic information about the people.

The demographic classification and composition measurement of people in the vicinity of the out-of-home media is performed automatically based on a novel usage of a plurality of means for capturing images and a plurality of computer vision technologies on the captured visual information of the people in the vicinity of the out-of-home media. The plurality of computer vision technologies can comprise face detection, person tracking, body parts detection, and demographic classification of the people, from the captured visual information of the people in the vicinity of the out-of-home media.

The present invention can count the number of people by their demographic composition during a predefined window of time.

Other Input Data Sources and Measurement

The present invention can also utilize other input data sources and sensors, such as radio-frequency identification (RFID) and infrared (IR) based sensors, for measuring behavior patterns, such as the traffic measurement. Door count from an existing system can also be used as other input data sources in an exemplary embodiment for behavior analysis. The present invention can count people who pass by in the vicinity of the out-of-home media and view the out-of-home media in the digital media network.

Alternative Input for Audience Information

In an exemplary embodiment, the present invention can combine the measurements of the behavior patterns and demographics of the people with the audience information to measure the impact of the media. The present invention utilizes a priori information for the measurement of demographics in the digital media network. Examples of a priori information can comprise the location and sales data of a particular site in the digital media network.

For other locations where media is present, the present invention models the expected audience by combining other data sources. These data sources include but are not limited to
number of transactions,
sales volume,
count at the door,
regional demographic data, and
play log of advertisement.

The next data set the present invention collects is the play log of advertisement. For digital screens, it could be a log from the media player; for other forms of marketing, it could be collected by other means. This information is then combined with the audience information to measure the impact of the media.

Various types of impact, measured by applying the present invention to a media network, can be found in the following areas:
information—examples include flight information in airports and wait-times for the next train;
advertising related to the location to uplift sales—examples include in-store promotions in a retail establishment;
advertising by third parties—examples include restaurant-based digital signage networks that sell advertising to local merchants, service providers and national advertisers;
enhanced customer experience—examples include digital signage in restaurant waiting areas to reduce perceived wait-time, and recipe demonstrations in food stores;
influencing customer behavior—examples include post office digital signage that directs patrons waiting in line to automated stamp machines, and retail digital signage designed to direct customers to different areas of the store, increasing the time spent on the store premises (dwell time); and
brand building—examples include Niketown stores where digital signage in video form is used as a part of the store decor to build a story around the brand.

Layers in the Present Invention

In an exemplary embodiment, the present invention comprises multiple layers, and the output of each layer is as follows:
physical layer—measurement
measurement/data layer—data stream
analysis layer—estimated parameter model
application layer—a set of ratings The network rating platform in the application layer of the exemplary embodiment of the present invention is a proprietary software module for a rating system. The set of ratings is based on standard rating output.

Sampling

The present invention can take samples from the universe of the plurality of screens or sites for measuring the statistics of demographic information and the behavior pattern analysis.

Based on the study of the media (for digital signage—different types of locations/regions of screen locations; for in-store marketing—different departments in which the media is located), the present invention develops a method to sample the locations where the actual measurement is taken.

Overall, the present invention maps the data stream by various input data sources and sensors to standard metrics and meaningful ratings. The present invention also updates the parameter model in the analysis layer by repeating the measurement.

Business Value Description

The business value by the present invention is multifaceted. The range of value stems from the inventions ability to deliver fact-based measurements at the point where media is actually displayed and consumed. The diversity of the measurements available further bolsters the impact of the solution in determining the value of out-of-home digital media and the way it is purchased and utilized. The solution utilizes tailored combinations of measurements to rate the reach, effectiveness and impact of out-of-home digital media networks.

In the absence of an accurate, scalable ratings system for out-of-home digital media, the industry growth has slowed down due to barriers related to the lack of consolidation and standardization. A rating system for out-of-home digital media will allow it to be compared and evaluated relative to other more traditional forms of media. The present invention will provide this rating, thus allowing for huge strides in the legitimization of out-of-home digital media. The rating will provide a currency on which the medium can be bought and sold, thus leveling the playing field and allowing it to compete for advertising dollars previously earmarked for other forms of media.

Out-of-home digital media presents many advantages and unique features over traditional forms of media. Its dynamic nature provides for unparalleled targeting of content and the ability to adjust content to the changing characteristics and needs of the audience, based on time of day, demographic makeup, location, etc. The measurements provided by the present invention will enable stakeholders at different levels to maximize the potential of out-of-home digital media and leverage its unique features to the fullest. The solution can be used to not only measure the volume of viewers and potential viewers, but also their characteristics, engagement with the media, and behaviors as a result of viewing the media.

From the business value point of view, the present invention is a method and system to measure the audience and their engagement with a plurality of out-of-home media. The method and system use a plurality of technologies to provide automated measurement of a number of people entering and leaving a given area (traffic) and the duration for which they were engaged with the media (engagement). This data is combined with other data sources (such as media player log, sales data, demographic information for that geography) and data from traditional research to provide an accurate measurement of audience traffic, segmentation and engagement for a given media.

In an exemplary embodiment, the present invention can provide accurate audience measurement for out-of-home media. Out-of-home media is defined as any communication devices used by advertisers to reach the audience present in a specific location. Some examples are in-store marketing, digital signage, mall based signage, and other public venues. Different locations attract different types of audiences and engage them differently. Accurate measurement of audience behavior and composition is necessary for advertisers and media planners to ascertain the value of the media in a specific location. For example, a media is considered valuable if it communicates with a large number of people belonging to a uniform demographic group.

In an exemplary embodiment, the present invention can provide targeted advertising. Targeted advertising can be done in two ways—real-time and gradual. For real-time advertising, the audience sensing device senses and characterizes the audience present in the front of the screen, using a plurality of technologies. This information is sent to the device that controls the media, which plays the content targeted to the person(s) in front of the screen. For gradual targeting, the data collected over a period of time will be used to understand and model how the audience composition changes with time. The invention will provide an approximate prediction of the type of audience expected in the vicinity of the screen at a given time. The information will be used to dynamically change content to match the needs of the expected audience segment.

The present invention captures a plurality of input images of the persons in the vicinity of the media by a plurality of means for capturing images. The present invention processes the plurality of input images in order to count the number of people in those images. The present invention also measures the duration for which each person in the image watches the media.

The processes are based on a novel usage of a plurality of computer vision technologies to automatically analyze the visual characterization of the persons from the plurality of input images. The present invention processes the plurality of input images in order to count and segment a person in each field of view of the plurality of means for capturing images.

In an exemplary embodiment, the present invention can model the audience of the entire network of the media. The process for actual data collection will be done in a sample of locations where the media is present. The sample selection will be done to cover different types of locations based on geography, size, and audience demographics. The data are combined with other types of data, such as transaction data or demographic information for a particular geography, to build a model that characterizes the network of media. The model will estimate the number of people exposed to the content played on the network and the duration of time the viewers watched the media. It will also predict the future audience attracted by the network.

Measured Objects

The present invention measures opportunity to see, total audience traffic, the size of the unique audience in a given time period, gross rating points, target rating points, cost per thousand impressions, and return on investment, based on the measurements for the behavior patterns and demographics of the people in the vicinity. In an exemplary embodiment, the present invention can provide data that will make it possible for advertisers and media owners to determine the value of the media, and thus buy and sell advertising space on the network. The data generated by the model will be used to develop ratings relevant to advertising measurement such as opportunity to see (OTS), gross rating points (gross rating points), cost per thousand gross impressions (CPM), engagement, and impression duration.

The parameters as they relate to out-of-home media are described below: Opportunity to see, or OTS, is a count of the total number of persons who were present in the vicinity of the media and could have been exposed to it. The present invention is novel in the way this is measured because it offers accurate measurement for individual media devices, such as screens. Previously, OTS measurements were indirectly derived from traffic information in the general area, and depended on multiple assumptions.

Gross impressions is defined as the number of persons who actually looked at the media and were exposed to it. Impression duration is the average amount of time a person looks at the media and is exposed to it. The present invention is unique in the way these parameters are measured. Previously, these measurements were done on an ad hoc basis and involved considerable manual intervention. Researchers had to be physically present at the location and record the observations. The methods and systems of this invention automate this process and make it scalable. It also makes it possible for advertisers to measure these parameters for individual advertisements by correlating the data with a media player log.

Gross rating points, or GRP, is defined as the as the audience reached times the number of times the ad is displayed. Target rating points, or TRP, is a subset of GRP, and is defined as the targeted audience reached times the number of times the advertisement is played. These metrics are calculated based on the measurements described above. Previously they were not as accurate because the underlying measurements were inaccurate and were indirectly derived. The present invention uses automated processes to segment customers according to their gender, age and ethnicity. Hence, it provides accurate and continuous TRP measurement.

Cost per thousand impressions, or CPM, is defined as the price an advertiser pays to get its message across to the customers. The better the network is at reaching the targeted audience, the higher CPM they get. Previously, a network received a static CPM amount that was calculated on a periodic basis. The present invention will facilitate accurate and continuous measurement, which can be used to dynamically change CPM for different day parts, weekdays, seasons, and special occasions.

Measurement of Each Person

The present invention analyzes the measurement of the behavior patterns and demographics of each person in the vicinity to attract different types of people, and to engage them differently for the out-of-home media. This analysis information is necessary for advertisers and media planners to ascertain the value of the media and the location. Therefore, the analysis information can be used to attract a uniform audience.

The present invention utilizes the measurement of the behavior patterns and demographics of each person in the vicinity to understand how the audience changes with time, enabling the advertiser to dynamically change the content to speak to a particular segment. Due to this feature, in an exemplary embodiment of the present invention, the real-time targeting is also possible with this data.

Output and its Representation

The present invention represents the set of ratings in various ways. For example, the exemplary output of the set of ratings can comprise layers of information. The exemplary representation of the output of the set of ratings, such as the layers of information, can comprise maps, tables, or pie charts.

Application of the Output

The present invention can match the set of ratings, based on the characteristic information, to product marketing or advertising in the digital media network.

The present invention can also measure the media effectiveness, based on the set of ratings and the characteristic information. The exemplary measurement of the media effectiveness can be achieved by analyzing what drives the people in a certain demographic composition to pay attention to a certain category of the out-of-home media. Another exemplary measurement of the media effectiveness can be achieved by analyzing how the subtle changes in the out-of-home media affect the set of ratings based on the characteristic information. The present invention can rezone the digital media network based on the set of ratings derived from the characteristic information. The present invention measures the pattern of changes in the characteristic information due to the changes in the matching product marketing or advertising.

Data Collection

In an exemplary embodiment, the present invention collects data, which includes traffic, gross impression, impression lengths, and demographics. The traffic can comprise the actual count of people present in the vicinity or a proxy, including the number of transactions and door counts. The gross impression can comprise the number of people who noticed the media. The impression lengths can comprise the duration for which the people notice the media. The demographics can comprise the segmentation of the people who notice the media. The present invention can collect the data on a per screen basis or on a regional basis.

The collected data can comprise:
  traffic—actual count of people present in the vicinity or a proxy such as number of transactions, door counts, etc.;
  gross impression—the number of people who noticed the media;
  impression lengths—the duration for which the people notice the media; and
  demographics—the segmentation of the people who notice the media.

The information can be collected on a per screen basis or on a regional basis.

Update of the Parameters

The present invention repeats the measurement to update the estimated parameters from the aggregated measurements. The parameters can comprise traffic to site, audience, area traffic, and traffic nearby the out-of-home media.

Rule Application Logic Module

The present invention can utilize a rule application logic module for analyzing and extracting characteristic information based on the estimated parameters from the aggregated measurements. The rule application logic module enables the adjustment in the analysis and extraction of characteristic information to be done in a structured and dynamic way. The exemplary parameter models, such as the formula, network model, and statistical model, can be dynamically adjusted based on the rule application logic module.

In an exemplary embodiment, the rule application logic module can construct a characteristic information extraction criteria based on a set of predefined rules. The rule application logic module can further construct the criteria based on a combination of a set of predefined rules, in which the analysis of the population in the network can be further divided into the analysis of subpopulations by the combination of rules.

The rule application logic module can further define domain-specific criteria for the extraction. Examples of the domain-specific criteria can comprise certain criteria that are constructed based on specific circumstances of samples in the network.

The rule application logic module can further apply a different set of criteria per each site in the samples, so that the application of a different set of criteria per each site in the samples allows the decision maker in the network to understand each site in the samples separately.

For example, the rule application logic module can differentiate the levels of measurement and analysis in a site based on their specific circumstances, where a first set of criteria are applied to a certain group of screens in the sampled site, and a second set of criteria are applied to another group of screens in the sampled site.

Among the plurality of sampled sites in the digital media network, the rule application logic module can also differentiate the levels of measurement and analysis, where a first set of criteria are applied throughout the network and a second set of criteria are applied to a predefined subset of the sampled sites to serve specific needs of the predefined subset. An exemplary first set of criteria can typically comprise common criteria throughout the network, and the second set of criteria is typically different from the first set of criteria.

Figure 2:
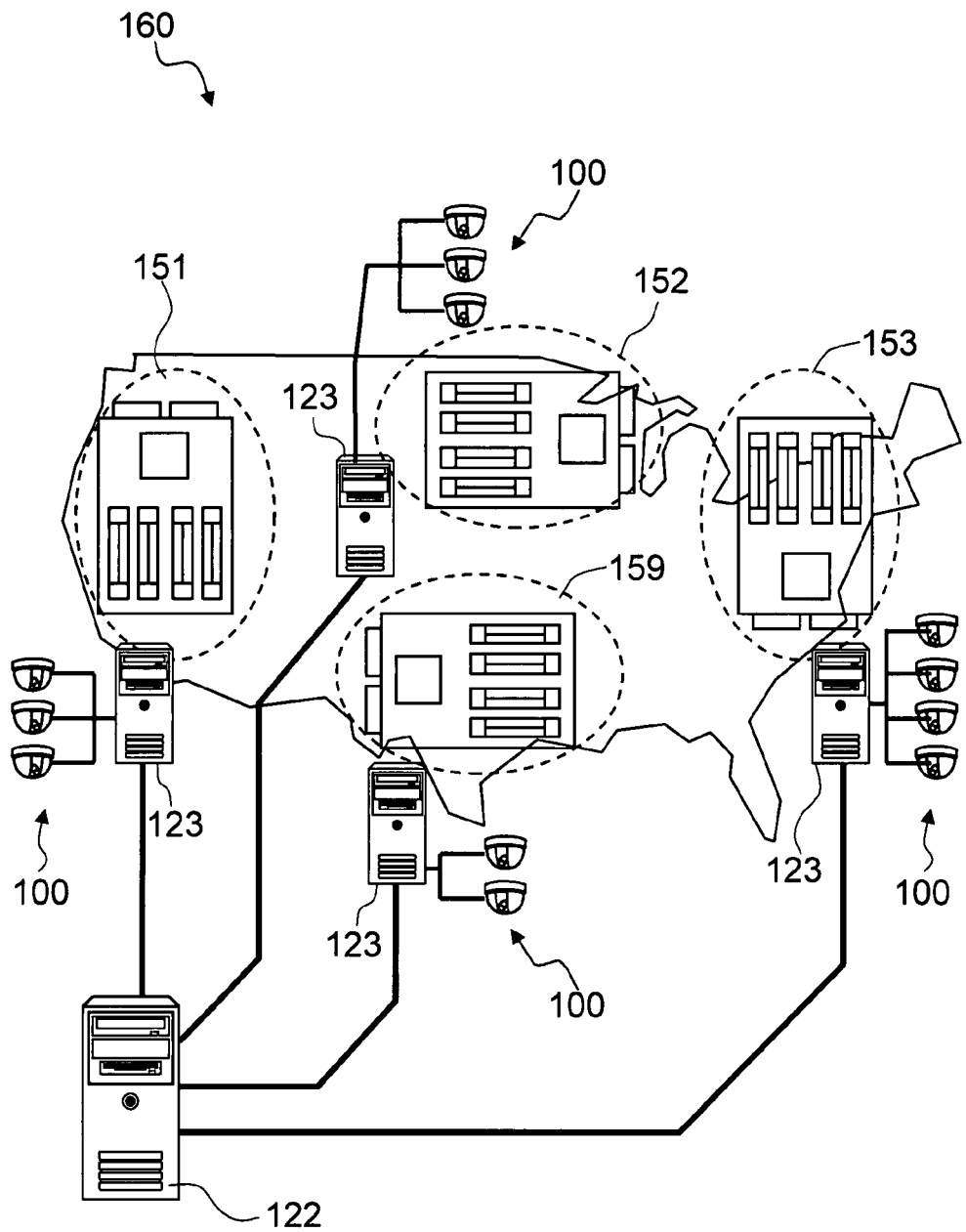
FIG. 2 shows an exemplary system architecture and hardware components of the present invention in a media network.

FIG. 2 shows an exemplary system architecture and hardware components of the present invention in a media network.

In the exemplary embodiment shown in FIG. 2, a "central server" 122 controls a plurality of vision processing units (VPUs). The "vision processing unit" 123 comprises a means for control and processing, means for video interface, and a plurality of means for capturing images 100. The VPU processes the measurement of the behavior patterns and demographics of people in the vicinity for each site, in coordination with the "central server" 122. The additional measurement devices, such as RFID and IR-based sensors, can also be similarly deployed in the vicinity of the out-of-home media.

In the exemplary embodiment shown in FIG. 2, a plurality of means for capturing images 100 are connected to the means for video interface. The means for control and processing takes digitized video data from the means for video interface. The means for control and processing can have internal means for storing data or external means for storing data.

The means for capturing images 100 can comprise an analog camera, USB camera, or Firewire camera. The means for video interface, which can comprise a video frame grabber, USB interface, or Firewire interface, are typically included in the same enclosure as the means for control and processing. The means for control and processing can be a general purpose personal computer, such as a Pentium 4 PC, or a dedicated hardware that can carry out the required computation. The means for control and processing, as well as the means for video interface, can be located locally or remotely, as long as the connection to the means for capturing images 100 can be established. The internal means for storing data, such as internal hard disks, is placed within the same enclosure as the means for control and processing. The external means for storing data, such as a network storage driver or internal hard disks contained in a remote computer, can be located locally or remotely, as long as a means for transferring data is available.

In an exemplary embodiment, a general purpose USB webcam can serve as the means for capturing images 100. A Pentium 4 2.8 GHz PC having 1 GB memory can serve as a means for control and processing, where a generic USB interface included in the PC's motherboard can serve as a means for video interface. A generic IDE hard disk drive can serve as the internal means for storing data or the external means for storing data.

Figure 3:
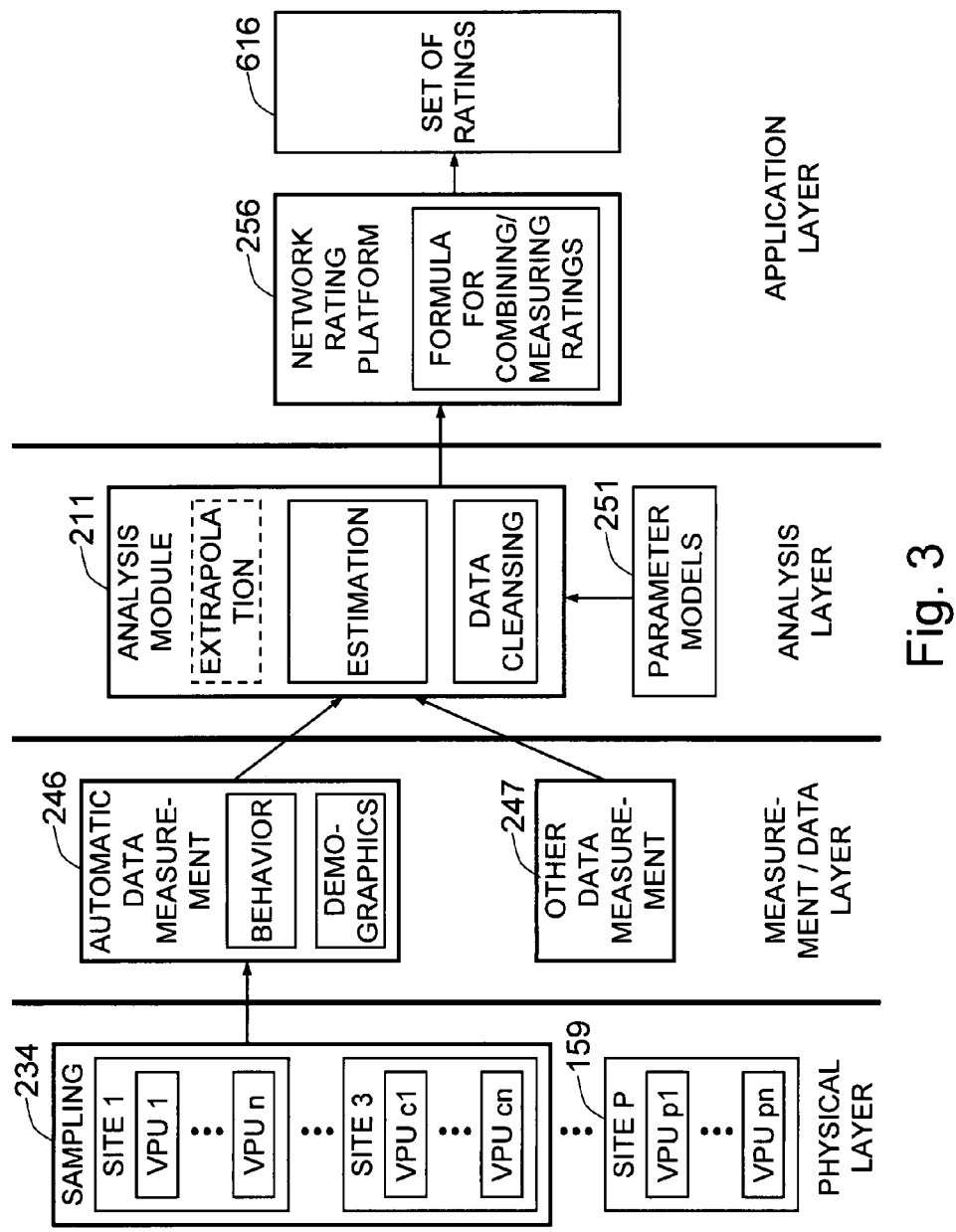
FIG. 3 shows an exemplary embodiment of the platform layers and their software modules for the measurement of the audience and their engagement with a plurality of out-of-home media, and the production of a set of ratings based on the analysis of the measurement in the present invention.

FIG. 3 shows an exemplary embodiment of the platform layers and their software modules for the measurement of the audience and their engagement with a plurality of out-of-home media, and the production of a set of ratings based on the analysis of the measurement in the present invention.

In an exemplary embodiment shown in FIG. 3, the present invention comprises multiple layers:
  physical layer,
  measurement/data layer,
  analysis layer, and
  application layer.

Physical Layer

At the physical layer in a preferred embodiment shown in FIG. 3, the present invention can take samples from the universe of the plurality of screens or sites for measuring the statistics of demographic information and the behavior pattern analysis. Based on the study of the media (for digital signage—different types of locations/regions where the screens are placed; for in-store marketing—different departments in which the media is located), the present invention develops a method to sample the locations where the actual measurement is taken. In the exemplary embodiment shown in FIG. 3, sites 1-3 are sampled by the sampling 234 step of the present invention, and the "Site P" 159 is not sampled.

Measurement/Data Layer

At the measurement/data layer in a preferred embodiment shown in FIG. 3, the present invention can process the automatic data measurement 246 for behavior patterns and demographics of the people in the vicinity of the sampled out-of-home media in a digital media network.

The present invention can also utilize other input data sources and sensors, such as radio-frequency identification (RFID) and infrared (IR) based sensors, for measuring the behavior patterns, such as the traffic measurement at the "OTHER DATA MEASUREMENT" step (247). Door count from the existing system can also be used as other input data sources in an exemplary embodiment for behavior analysis. The present invention can count people who pass by in the vicinity of the out-of-home media and view the out-of-home media in the digital media network.

In an exemplary embodiment, the present invention can combine the measurements for the behavior patterns and demographics of the people with the audience information. The present invention utilizes a priori information for the measurement of demographics in the digital media network. Examples of a priori information can comprise the location and sales data of a particular site in the digital media network.

For other locations where media is present, the present invention models the expected audience by combining other data sources. These data sources include but are not limited to
  number of transactions,
  sales volume,
  count at the door,
  regional demographic data, and
  play log of advertisement.

Analysis Layer

At the analysis layer in a preferred embodiment shown in FIG. 3, the analysis module 211 of the present invention can extrapolate the measurement, estimate a parameter model, and process data cleansing. The information from the preexisting parameter model 251 can be integrated to the data of the analysis module 211, and the parameter model 251 can then be updated with the new measurement results.

Application Layer

At the application layer in a preferred embodiment shown in FIG. 3, the network rating platform 256 of the present invention produces a set of ratings 616. The network rating platform 256 in the application layer of the exemplary embodiment of the present invention is a proprietary software module for a rating system. The set of ratings 616 is based on standard rating output.

In an exemplary process, consider a digital media network that has 200 sites and 5 screens at every site, i.e. a total of 1000 screens (200×5). If we use 2 cameras per screen (1 top down and 1 frontal) then we need 2000 (1000×2) cameras to gather the measurement for the whole network. In this exemplary process the data can be gathered more efficiently by clustering the screens into groups, sampling the screens where the actual measurement is gathered, and statistically extrapolating the data for the remaining screens. E.g. we could collect data at only 50 screens using 100 cameras (50×2). Then, in the analysis layer, combine the data gathered from the cameras with other data, such as number of transactions, traffic, etc. to extrapolate data for all the screens in the network. This extrapolated data is then sent to the network rating platform that further analyzes the data and produces different ratings. 616.

Figure 4:
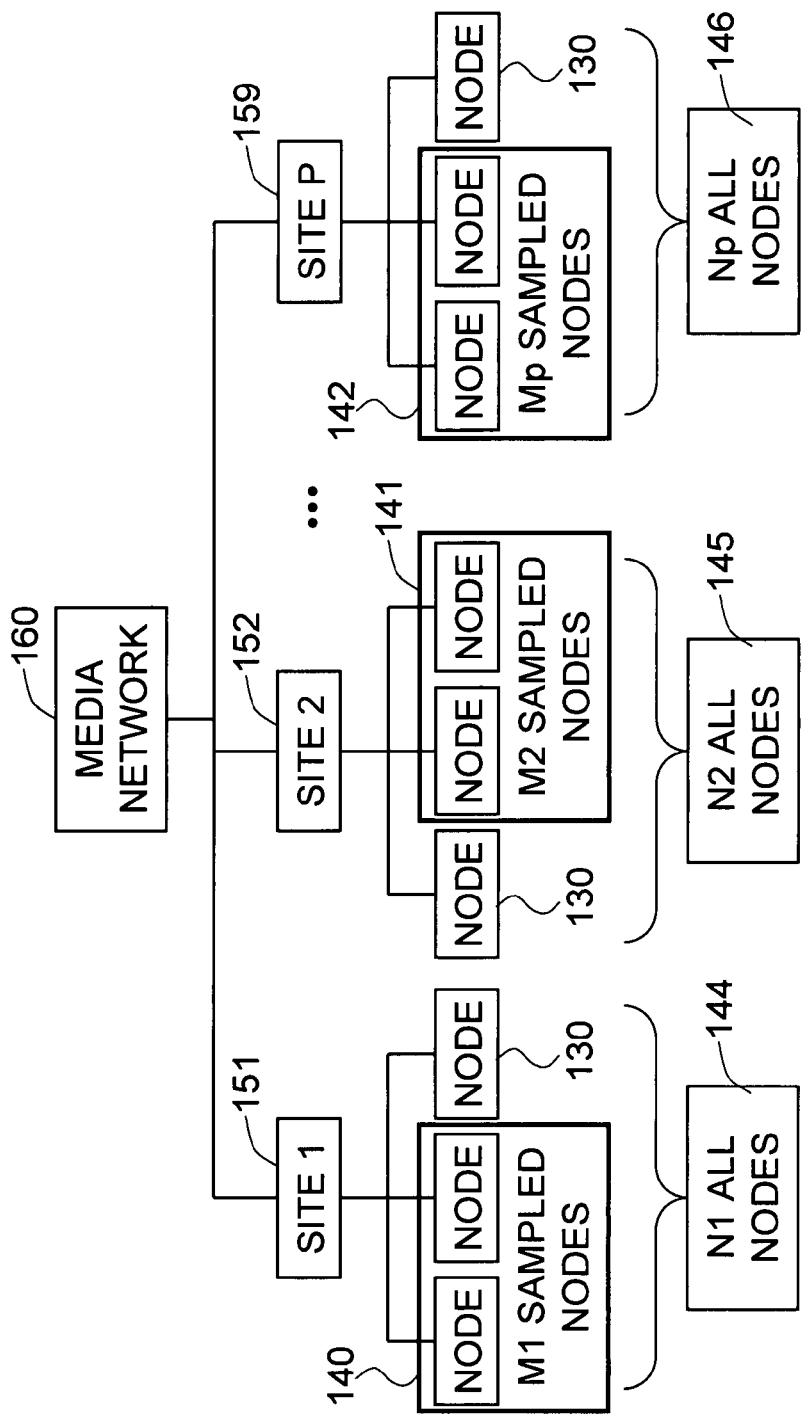
FIG. 4 shows the hierarchy of an exemplary media network with an exemplary embodiment of the invention, where the media network consists of a plurality of sites, and some of the nodes of each site of the plurality of sites are sampled for the behavior analysis and demographics measurement.
Figure 5:
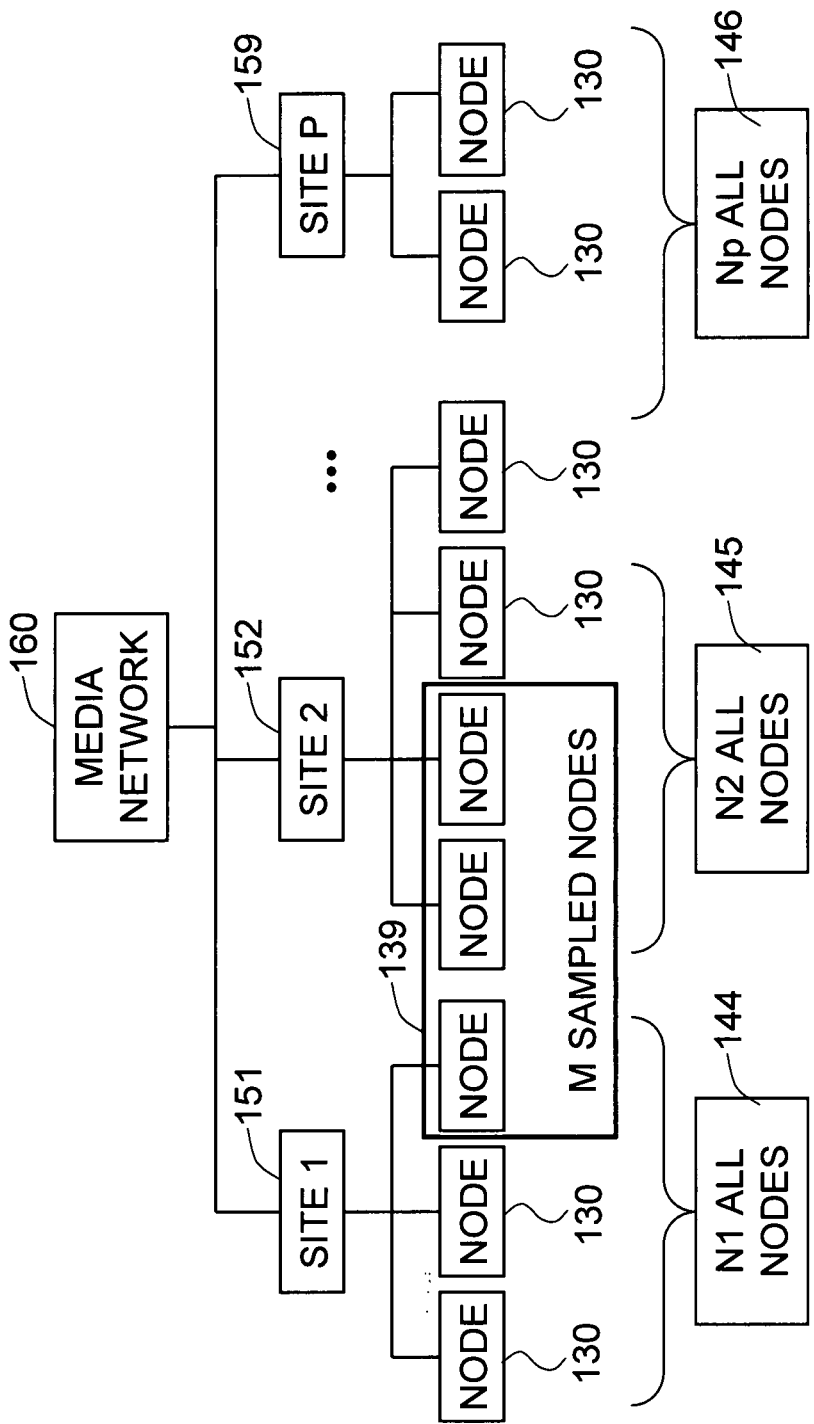
FIG. 5 shows the hierarchy of another exemplary media network with an exemplary embodiment of the invention, where the media network consists of a plurality of sites, and some of the nodes across the media network are sampled for the behavior analysis and demographics measurement.

FIG. 4 and FIG. 5 show exemplary sampling processes in the present invention. In FIG. 4 and FIG. 5, the node can be defined as a unit with out-of-home media.

FIG. 4 shows the hierarchy of an exemplary media network 160 with an exemplary embodiment of the invention, where the media network 160 consists of a plurality of sites, and some of the nodes of each site in the plurality of sites are sampled as sampled nodes 132 for the behavior analysis and demographics measurement. In FIG. 4, "M1 sampled nodes" 140 out of "N1 all nodes" 144 in the "site 1" 151, "M2 sampled nodes" 141 out of "N2 all nodes" 145 in the "site 2" 152, and "Mp 142 sampled nodes" out of "Np all nodes" 146 in the "site p" 159, in the plurality of sites, are sampled for the behavior analysis and demographics measurement.

FIG. 5 shows the hierarchy of another exemplary media network 160 with an exemplary embodiment of the invention, where the media network 160 consists of a plurality of sites, and some of the nodes across the media network 160 are sampled for the behavior analysis and demographics measurement. In the exemplary embodiment in FIG. 5, the "M sampled nodes" 139 are selected across the media network 160, whereas the sampled nodes, such as 140, 141, and 142 in the exemplary embodiment in FIG. 4, were selected within each site 150.

Although, in the preferred embodiment of the invention, the present invention samples some of the measurement nodes or sites from all the nodes and sites in a media network, the present invention can also measure all of the nodes or sites in the media network. In the exemplary embodiment shown in FIG. 4 or FIG. 5, every node, such as "N1 all nodes" 144 in the "site 1" 151, "N2 all nodes" 145 in the "site 2" 152, and "Np all nodes" 146 in the "site p" 159, in the plurality of sites, can be used for the behavior analysis and demographics measurement in another embodiment of the present invention.

Figure 6:
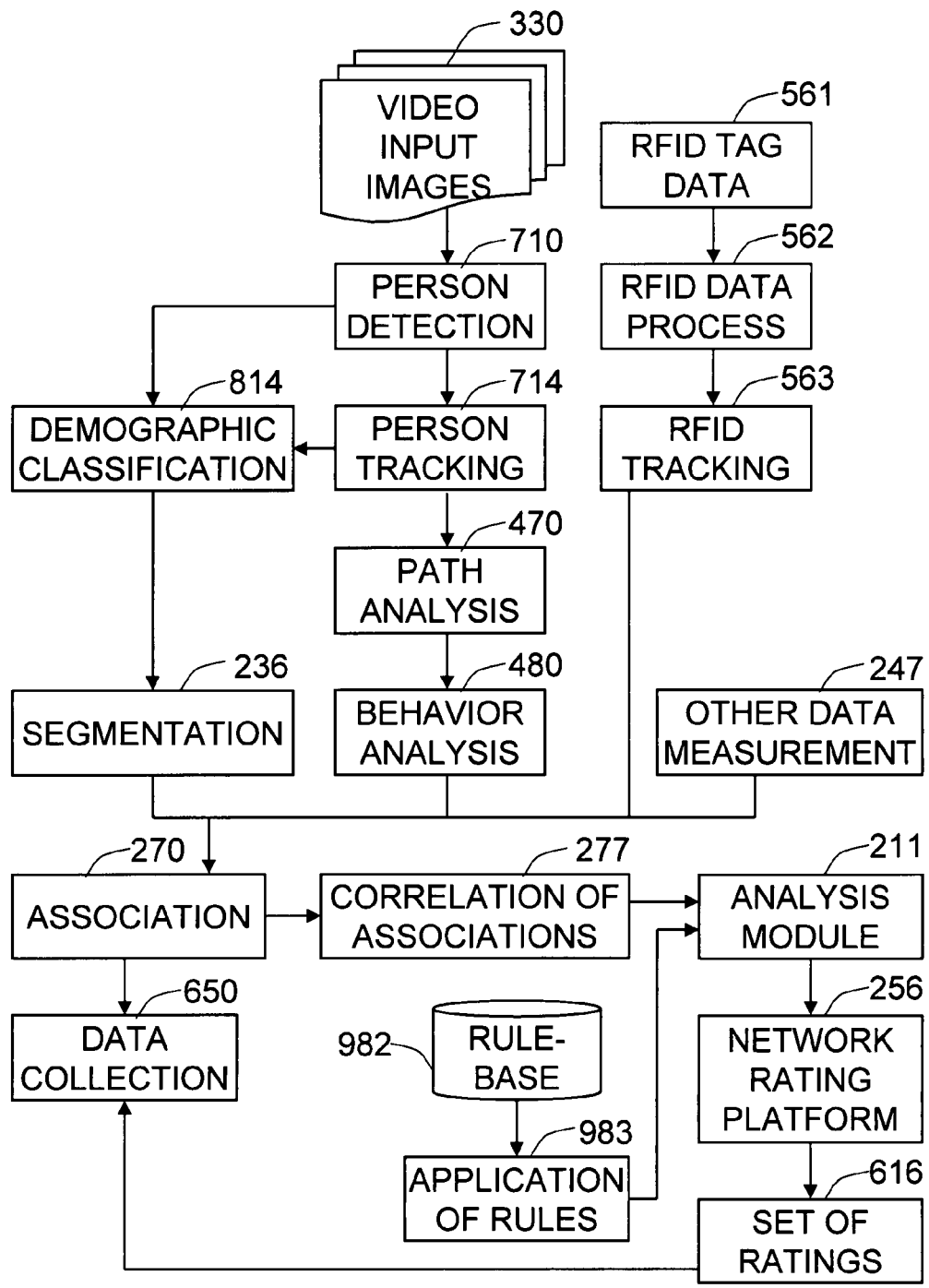
FIG. 6 shows an exemplary process in the measurement and data layer, in which computer vision based behavior analysis and segmentation measurement, and RFID-based measurement, time-based measurement (such as loyalty card data or survey data), and the transaction data are combined in an exemplary embodiment of the invention.

FIG. 6 shows an exemplary processes in the measurement and data layer, in which computer vision based behavior analysis and segmentation measurement, i.e., demographics measurement, RFID-based measurement, time-based measurement (such as loyalty card data or survey data), and the transaction data are combined in an exemplary embodiment of the invention.

In the exemplary embodiment shown in FIG. 6, the present invention detects 710 and tracks 714 a person, such as a customer, in the video input images 330, from a plurality of means for capturing images 100. The present invention can join the trajectories of the person tracks from a video of a means for capturing images 100 to another video of a means for capturing images 100 while the person appears and disappears between the fields of view among a plurality of means for capturing images 100. Based on the tracking information, the present invention performs the path analysis 470 of the particular person. The path analysis 470 can be used as one of the ways to process the behavior analysis 480 of a person and obtain useful information about the person's behavior, such as engagement behavior with the media.

The present invention can utilize any reliable video-based tracking method for a single customer and a group of customers in the prior art, in regards to the behavior analysis. For example, U.S. Provisional Pat. No. 60/833,031 of Sharma, et al. (hereinafter Sharma 60/833,031) disclosed an exemplary process of video-based tracking and behavior analysis for a single customer or a group of customers, using multiple means for capturing images in a preferred embodiment of the invention.

The present invention can also process segmentation 236 of the audience, based on the images of the audience in the video. Demographic classification 814 is an exemplary segmentation 236 of the audience.

The present invention can utilize any reliable demographic composition measurement method in the prior art as an exemplary video-based segmentation of the audience. For example, U.S. Provisional Pat. No. 60/808,283 of Sharma, et al. (hereinafter Sharma 60/808,283) disclosed an exemplary demographic composition measurement based on gender and ethnicity.

The association of the segmentation data, such as the demographic measurement, with the RFID-based tracking information and video-based behavior analysis of an audience, provides a deeper understanding for the relationship between the ratings of a media and demographic background of the audience.

The present invention processes 562 the RFID data, which is sensed by a plurality of RFID receivers, and tracks 563 the person based on the sequence of the RFID tag data 561 readings for the proximity detection.

The present invention can associate the RFID-based tracking with the video-based tracking and segmentation 236, through an association 270 process. The section for Combined Visual-RFID Tracking in U.S. Provisional Pat. No. 60/876,411 of Sharma, et al. (hereinafter Sharma 60/876,411, pages 21-25) discusses an exemplary method of the association process.

In the exemplary embodiment, the association 270 process can also associate the RFID-based tracking with the other data measurement 247, such as any time-based measurement, that could provide meaningful information for the audience of the media. Examples of the other data measurement 247 can comprise sales/transaction data, conversion data, geo-spatial data, royalty data, type of location, site traffic, and site model.

The associated data can be stored in a database at the data collection process 650.

The present invention can correlate 277 a plurality of associations based on the unique RFID tag identification, even if each of the plurality of associations were gathered discretely. The "correlation of the associations" 270 helps in understanding the entire trip behavior of an audience in a site, even though the plurality of means for capturing images in the present invention may not cover the entire trip of the audience.

The correlated data are sent to the analysis module 211, whose output will be used by the network rating platform 256 to produce a set of ratings 616. The analysis of the measured data can be further facilitated by applying 983 a set of pre-defined rules in a rule-base 982.

Figure 7:
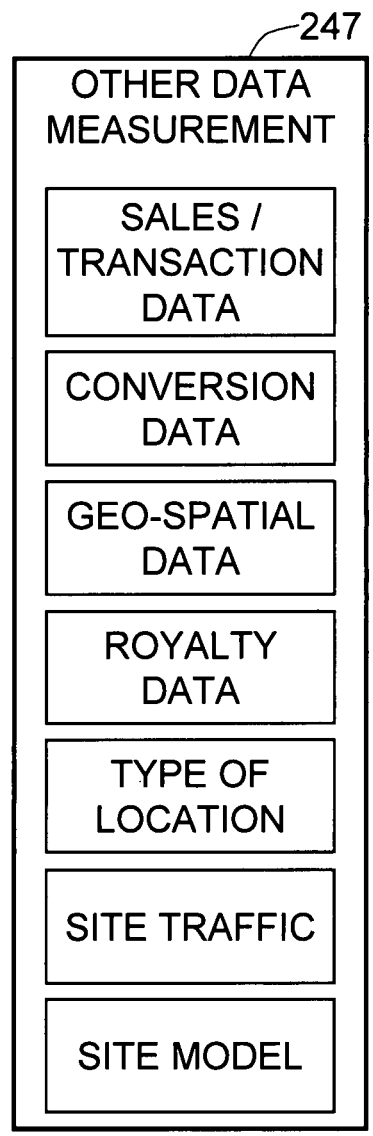
FIG. 7 shows details of other data measurement module in an exemplary embodiment of the present invention.

FIG. 7 shows details of the other data measurement 247 module in an exemplary embodiment of the present invention.

In an exemplary embodiment, the present invention can combine the measurements for the behavior patterns and demographics of the people with the audience information through the other data measurement 247. As shown in FIG. 7, the other data measurement 247 can comprise sales/transaction data, conversion data, geo-spatial data, royalty data, type of location, site traffic, and site model.

The present invention utilizes a priori information for the measurement of demographics in the digital media network. Examples of a priori information can comprise the location and sales data of a particular site in the digital media network. For other locations where media is present, the present invention models the expected audience by combining the other data sources. These data sources include, but are not limited to number of transactions,
sales volume,
count at the door,
regional demographic data, and
play log of advertisement.

Figure 8:
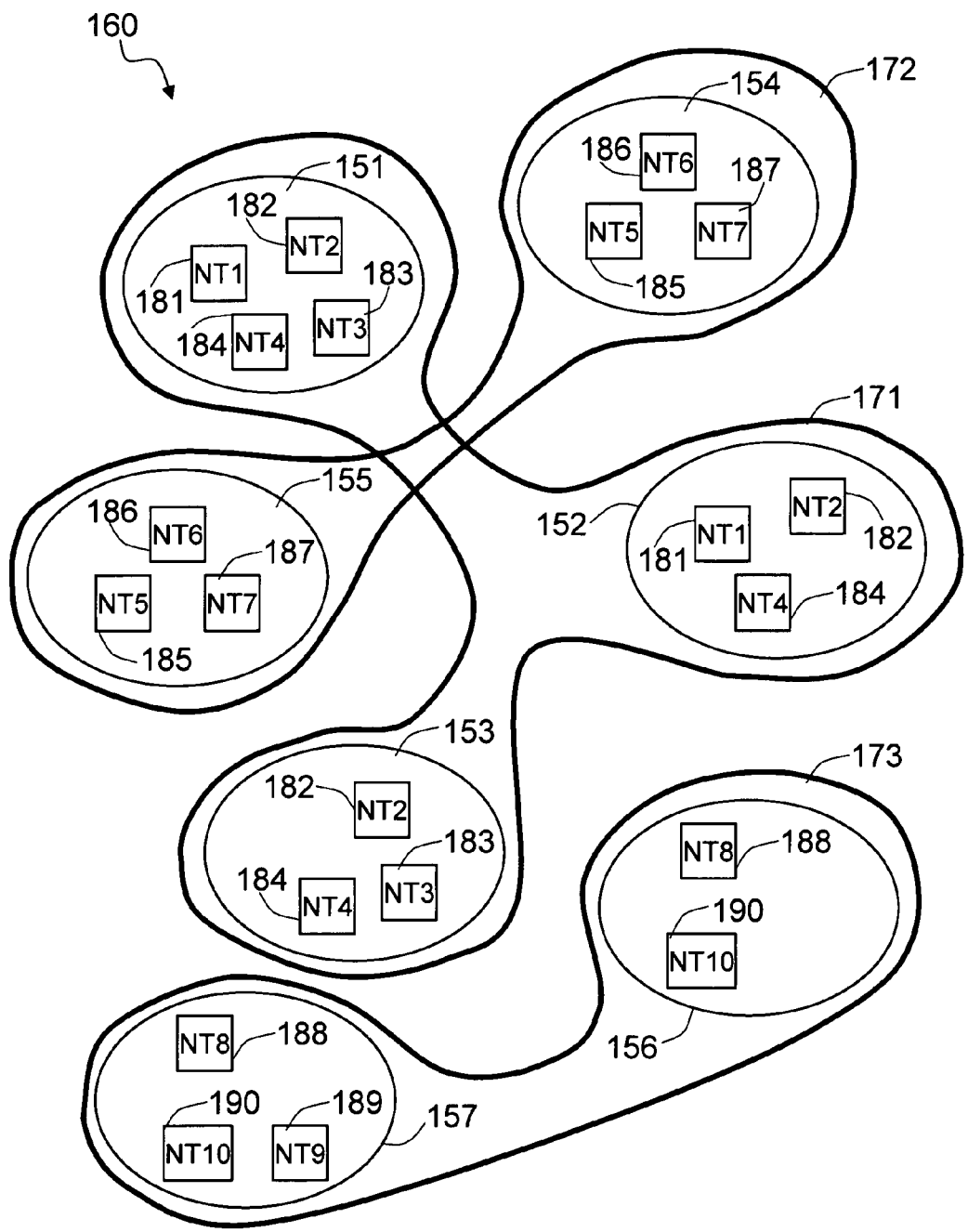
FIG. 8 shows an exemplary clustering of sites as a part of the exemplary extrapolation process in an exemplary embodiment of the present invention.

The analysis module of the present invention can utilize any well-known extrapolation methods for extrapolating the measurement of behavior patterns and demographic analysis at the analysis layer. FIG. 8 and FIG. 9 show an exemplary extrapolation process, based on the clustering of sites in a media network, in an exemplary embodiment of the present invention.

FIG. 8 shows an exemplary clustering of sites as a part of the exemplary extrapolation process in an exemplary embodiment of the present invention.

In the exemplary embodiment, sites with similar node types are clustered together. The node types can be defined based on various factors, such as the type of media in the sampled node, the similarity results from the previous behavioral pattern analysis in the vicinity of the media, the demographic similarity of the local region where the sampled site is located, the transaction data, and the relative location of the node in the store layout in each site in the media network.

For example, the "site cluster 1" 171 can comprise "site 1" 151, "site 2" 152, and "site 3" 153, in the exemplary embodiment. Similarly, the "site cluster 2" 172 can comprise "site 4" 154 and "site 5" 155, and the "site cluster 3" 173 can comprise "site 6" 156 and "site 7" 157, in the exemplary embodiment.

The "site 1" 151, "site 2" 152, and "site 3" 153 in the "site cluster 1" 171 can comprise "node type 1" (NT1) 181, "node type 2" (NT2) 182, "node type 3" (NT3) 183, and "node type 4" (NT4) 184. Similarly, the "site 4" 154 and "site 5" 155 in the "site cluster 2" 172 can comprise "node type 5" (NT5) 185, "node type 6" (NT6) 186, and "node type 7" (NT7) 187. Furthermore, the "site 6" 156 and "site 7" 157 in the "site cluster 3" 173 can comprise "node type 8" (NT8) 188, "node type 9" (NT9) 189, and "node type 10" (NT10) 190.

Not all the sites may have the same number of node types. In the exemplary embodiment, the "site 1" 151 comprises all of the four different node types, while the "site 2" 152 comprises only "node type 1" (NT1) 181, "node type 3" (NT3) 183, and "node type 4" (NT4) 184, and the "site 3" 153 comprises only "node type 2" (NT2) 182, "node type 3" (NT3) 183, and "node type 4" (NT4) 184.

FIG. 9 shows an exemplary table for the category of clustered sites and an exemplary table for node type and information for the exemplary extrapolation process based on the clustering of the sites in an exemplary embodiment of the present invention.

The present invention can keep a table for the category of clustered sites 162, which comprises information for the site clusters and their associated node types. Once the categorization is processed, the present invention can produce a table for the list of node types and their associated information in the exemplary table for node type and information 163. The table comprises the attribute information for the node cluster category, site, and location of all the available nodes for each node type.

In the exemplary embodiment shown in FIG. 9, the "node type 1" (NT1) 181 in the node type column comprises two sets of attributes, [CAT1, SITE1, LOC1] and [CAT1, SITE2, LOC1], which designate the "node type 1" (NT1) 181 in the "site 1" 151 and "site 2" 152. The "node type 1" (NT1) 181 cannot be found in any other sites in the media network according to the exemplary embodiment. Similarly, the other node types in the node type column comprise their relevant sets of attributes, which designate the corresponding node types in the relevant sites.

Based on the exemplary table for node type and information 163, the present invention can select sample nodes per each node type and extrapolate the result to all the other nodes within the same node type category. For simplicity, the number of attribute sets per node type in the exemplary table for node type and information 163 shown in FIG. 9 is very minimal. However, in real-world application, the number of attribute sets per node type is usually large. The percentage value of the sampling for the—sample nodes per each node type can be predefined by the decision maker of the media network 160.

Figure 10:
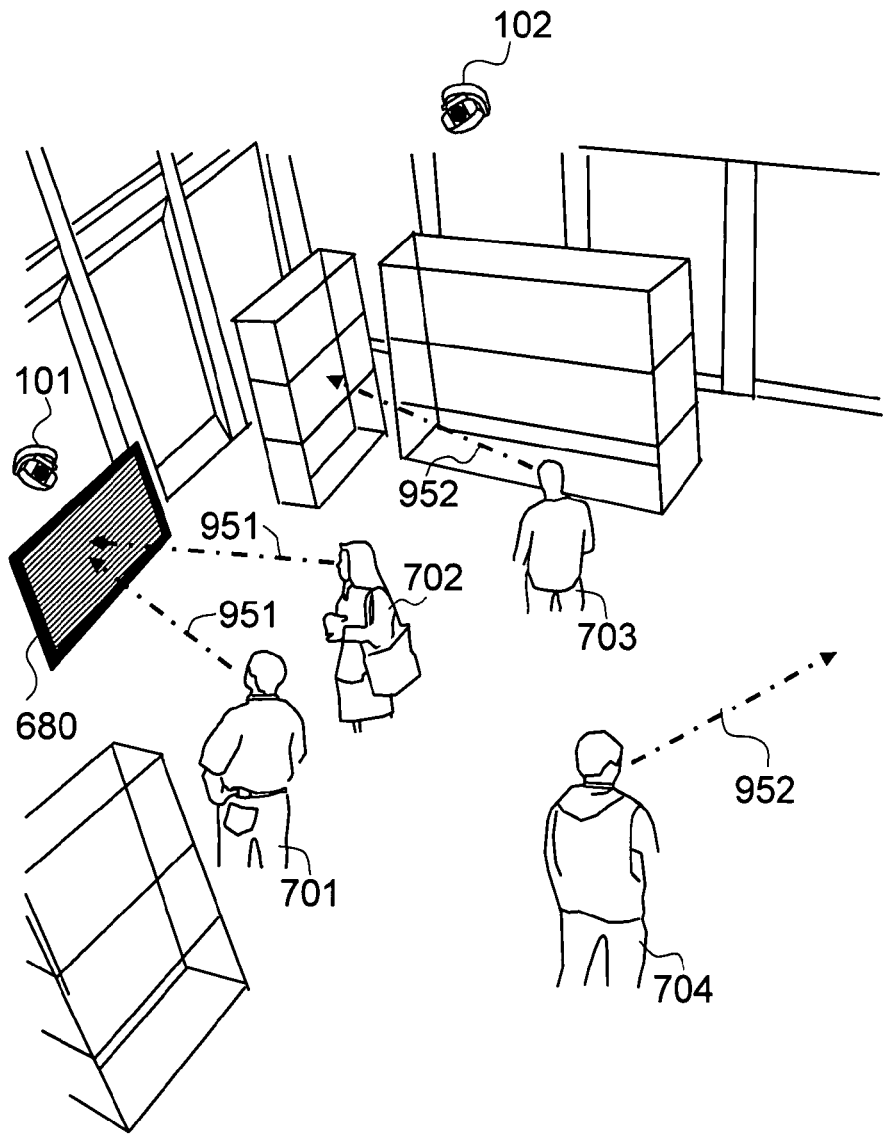
FIG. 10 shows an exemplary application of the present invention to the network design and planning studies in an exemplary embodiment of the present invention.

FIG. 10 shows an exemplary application of the present invention to the network design and planning studies in an exemplary embodiment of the present invention.

Network Design & Planning Studies

Context greatly influences the impact of media in a public place. Designing, refining and measuring the effectiveness of the media network all require an understanding of the physical environment, the potential audience, and the ways in which the two interact, which the present invention can facilitate.

The present invention can meet the specific goals of the media network by enabling the media network to base its design on a deep understanding of factors that affect the potential audience and by optimizing each aspect of the network prior to full-scale implementation. The exemplary embodiment in FIG. 10 shows how the present invention can measure the potential audience for a media in a site of a media network.

In the exemplary embodiment, as shown in FIG. 10, the present invention can comprise a first means for capturing images 101 and a second means for capturing images 102. The second means for capturing images 102 detects and tracks a plurality of people in the vicinity of the targeted media 680 and outside the opportunity to see area. In the exemplary embodiment shown in FIG. 10, the present invention can distinguish the viewers, the "person 1" 701 and the "person 2" 702, from the passers-by or outsiders, the "person 3" 703 and the "person 4" 704. This is because viewing from the "person 1" 701 and the "person 2" 702 can be measured as the attentive viewership for the displayed object 951, while the viewing from the passers-by or the outsiders can be measured as a general looking 952 to a nearby object or non-targeted object.

Potential Viewership

The present invention measures the potential viewership for a targeted media 680, or those with an opportunity to see, by tracking the behavior of persons around a given targeted media 680. The present invention employs systems utilizing a means for capturing images 100, such as the second means for capturing images 102, which are generally placed to view persons from above, to collect information about the viewers' proximity to a targeted media 680. In the exemplary embodiment, as shown in FIG. 10, the second means for capturing images 102 can be used for this purpose. Using this method, the present invention provides data on those who were in the vicinity of, and had an opportunity to view, the targeted media 680. In the past, opportunity to see has been used as a measure of displayed object effectiveness and reach. While the present invention can measure actual viewership, opportunity to see is still a useful measure—particularly when evaluating the ratio of potential audience to actual viewership.

Actual Viewership

Measurement of the actual viewership for the targeted media 680 (the total number of impressions) is carried out using a forward facing means for capturing images that detects when persons are viewing the screen. In the exemplary embodiment, as shown in FIG. 10, the first means for capturing images 101 can be used for this purpose. An impression is counted when a person has looked in the direction of the screen for a predetermined amount of time, as defined in conjunction with the client. The sum total of impressions for a targeted media 680 constitutes the actual viewership for that targeted media 680. Measurement of actual viewership provides the basis for establishing the value of a targeted media 680, using traditional media valuation terms, such as CPM or cost per thousand impressions. Prior, opportunity to see, or traffic around a targeted media 680, was commonly used to extrapolate the true viewership of a targeted media 680.

Impression Length

In addition to counting impressions, the present invention provides information about the duration of these impressions. These durations, or impression lengths, are useful in gauging viewer engagement with a particular targeted media 680 or content being delivered at the time of the impression. The decision maker of the media network can fine-tune their content to match the typical impression length of a given targeted media 680.

Figure 11:
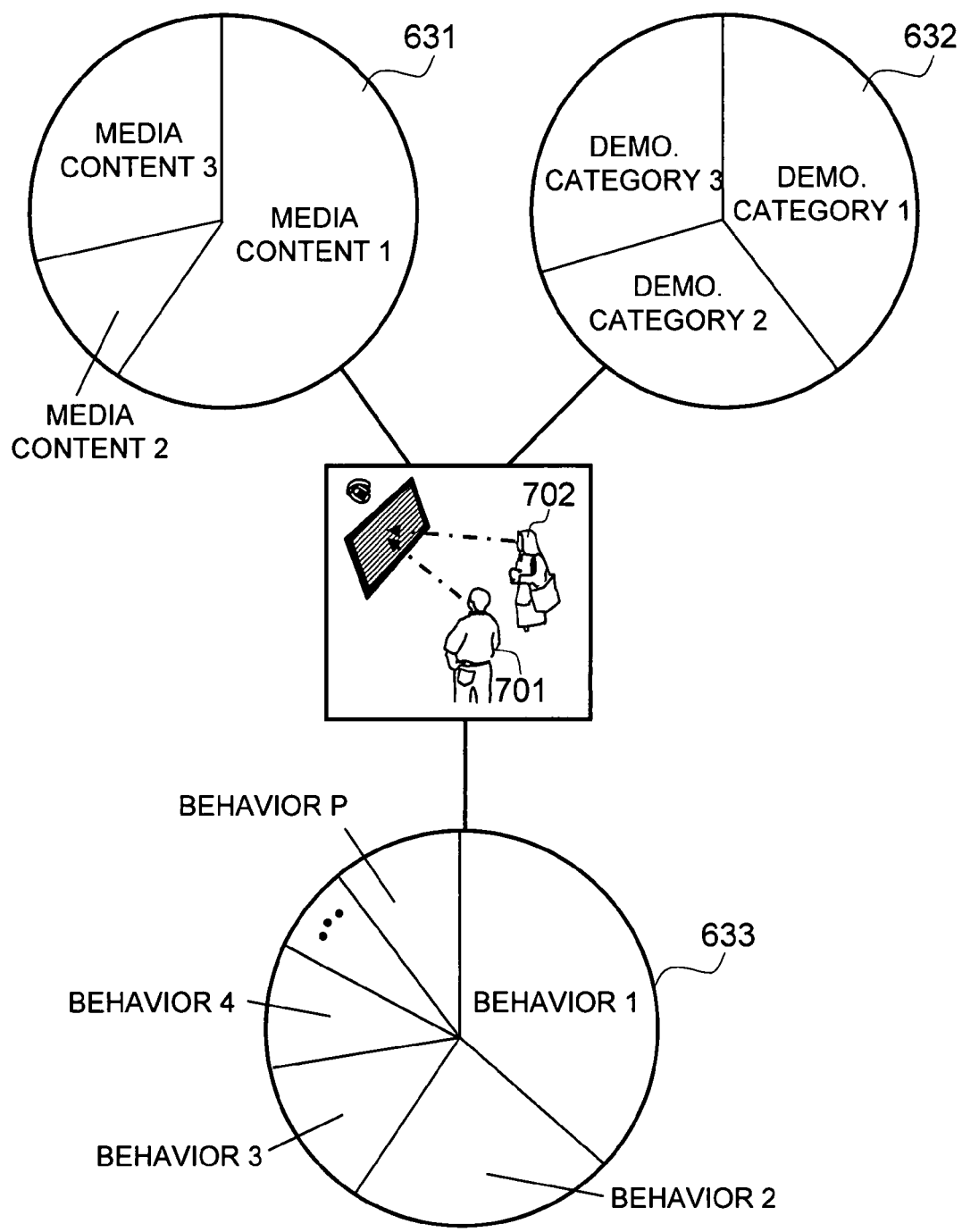
FIG. 11 shows an exemplary application of the present invention to the network validation studies in an exemplary embodiment of the present invention.

FIG. 11 shows an exemplary application of the present invention to the network validation studies in an exemplary embodiment of the present invention.

Network Validation Studies

The present invention can validate the performance of a media network through measuring the effectiveness of the media network by providing fact-based evidence of the network's reach, audience characteristics, and ultimate impact. True buy-in for the network requires proof of actual reach and performance. Based on the goals of the network, the present invention can measure what matters most—from the number of actual viewers and viewer demographics, to sales uplift and changes in viewer behavior. The network validation studies can be performed as a one-time or recurring service.

The exemplary data in FIG. 11 shows an exemplary proof of actual reach and performance of a media by the automatic demographic composition measurement and behavior pattern analysis for the viewers, i.e., the exemplary "person 1" 701 and "person 2" 702, in an exemplary embodiment of the present invention. As shown in the "pie chart 1" 631 for the media content, the "pie chart 2" 632 for the demographic composition, and the "pie chart 3" 633 for the behavior category analysis, which are created by the automatic measurement in the present invention, the present invention can provide deeper insights for the fact-based evidence of the network's reach, audience characteristics, by comparing the pie charts for the media contents at the predefined target window of time for the measurement. Utilizing the capability of the media effectiveness measurement, the information that drives customers to buy a certain category of products, or the subtle changes in merchandise location, offering, or media affect the demographic composition or behavioral pattern change, can also be known.

Figure 12:
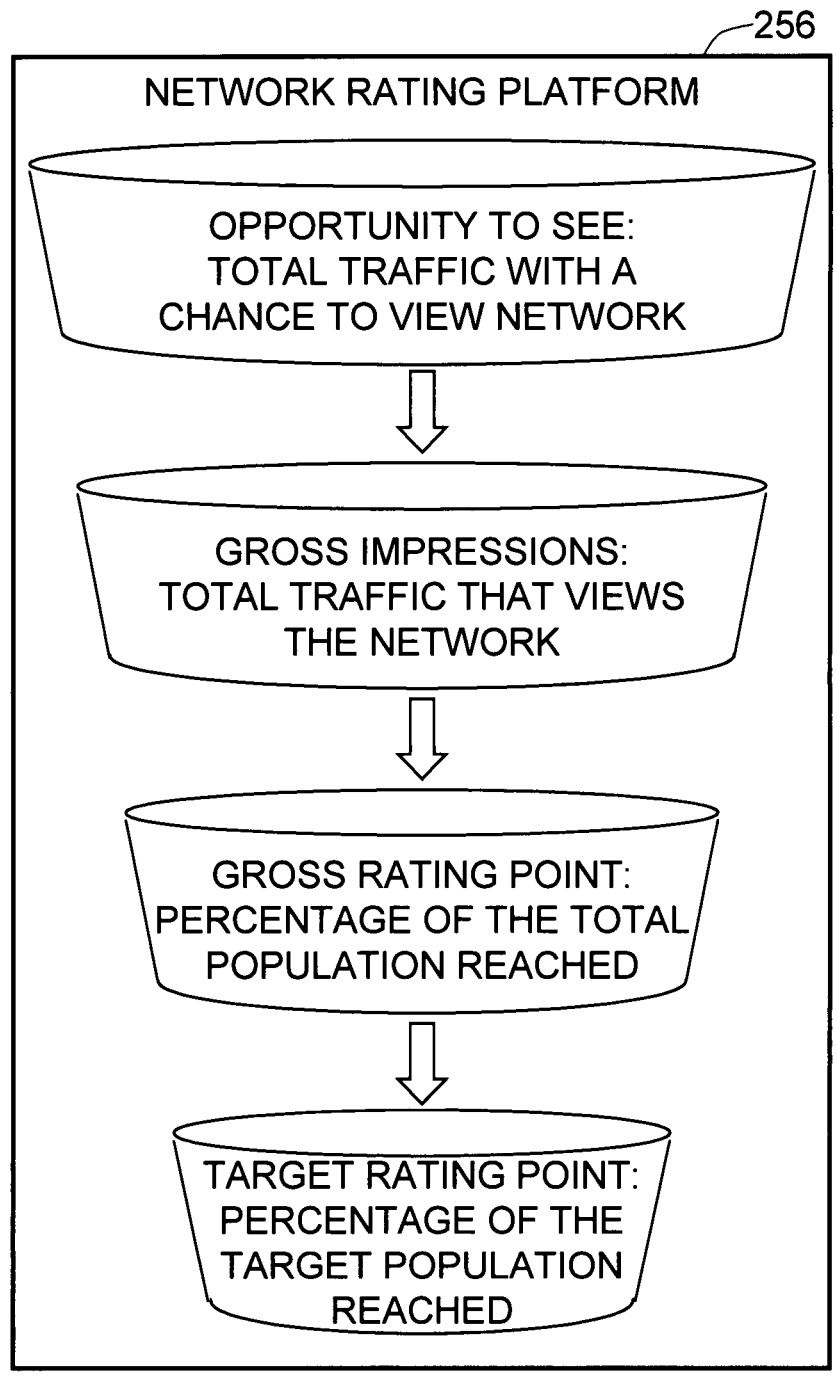
FIG. 12 shows exemplary network rating services as an application of the present invention to the ongoing network rating services in an exemplary embodiment of the present invention.

FIG. 12 shows exemplary network rating services as an application of the present invention to the ongoing network rating services in an exemplary embodiment of the present invention.

Ongoing Network Rating Services

The biggest problem facing advertising-based networks has been the absence of a definitive, measurable currency on which to base advertising sales. To meet this need, the present invention can provide third-party network ratings to foster and grow advertising sales. With a multitude of measurement capabilities at hand, the present invention delivers a variety of ratings ranging from the traditional gross rating points (GRP) to measures of target rating points (TRP), audience engagement, and network impact. The present invention can help differentiate the owner or decision maker of the embodiment of the present invention from the growing number of digital media networks by utilizing true, ongoing measurement and unlocking elusive advertising dollars.

In the exemplary embodiment shown in FIG. 12, the network rating platform 256 produces a set of ratings 616, such as opportunity to see (OTS), gross impressions, gross rating points (GRP), and target rating points (TRP). The network rating platform 256 is a proprietary software module for a rating system. The set of ratings 616 is based on standard rating output.

Measured Ratings

The present invention can measure the opportunity to see, total audience traffic, the size of the unique audience in a given time period, gross rating points, target rating point, cost per thousand impressions, and return on investment, based on the measurements for the behavior patterns and demographics of the people. In an exemplary embodiment, the present invention can provide data that will make it possible for advertisers and the media owners to value the media, and thus buy and sell advertising space on the network. The data generated by the model will be used to develop ratings relevant to advertising measurement such as opportunity to see (OTS), gross rating points (GRP), cost per thousand gross impressions (CPM), engagement, impression duration.

The parameters, as they relate to out-of-home media, are described here.

Opportunity to see, or OTS, is a the count of the total number of persons who were present in the vicinity of the media and could have been exposed to it. The present invention is novel in the way this is measured because it offers accurate measurement for individual media devices, such as screens. Previously OTS measurements were indirectly derived from traffic information in the general area, and depended on multiple assumptions.

Gross impressions is defined as the number of persons who actually looked at the media and were exposed to it. Impression duration is the average amount of time a person looks at the media and is exposed to it. The present invention is unique in the way these parameters are measured. Previously these measurements were done on an ad hoc basis and involved considerable manual intervention. Researchers had to be physically present at the location and record the observations. The methods and systems of this invention automate this process and make it scalable. It also makes it possible for advertisers to measure these parameters for individual advertisements by correlating the data with a media player log.

Gross rating points, or GRP, is defined as the audience reached times the number of times the ad is displayed. Target rating points, or TRP, is a subset of GRP, and is defined as the targeted audience reached times the number of times the advertisement is played. These metrics are calculated based on the measurements described above. Previously they were not as accurate because the underlying measurements were inaccurate and were indirectly derived. The present invention uses automated processes to segment customers according to their gender, age and ethnicity. Hence, it provides accurate and continuous TRP measurement.

Cost per thousand impressions, or CPM, is defined as the price an advertiser pays to get its message across to the customers. The better the network is at reaching the targeted audience the higher CPM they get. Previously, a network received a static CPM amount that was calculated on a periodic basis. The present invention will facilitate accurate and continuous measurement, which can be used to dynamically change CPM for different day parts, weekdays, seasons, and special occasions.

Exemplary indices to calculate the ratings and characterize the network in the present invention are as follows.

1. Demographic Index $$X/\mu * 100 \qquad (1)$$

X—the percentage of the audience of a screen belonging to a specific demographic group μ—the percentage of that particular demographic group in the national population.

The demographic index gives us the ability to compare the capacity of different screens and networks in reaching specific demographic segments.

2. Engagement Index $$1/n * \sqrt{(\Sigma_{(i=1 \text{ to } n)} t_i^2)} \qquad (2)$$

$t_i$—impression duration of individual members of the audience n—total num of persons in the audience Root Mean Square Average of all the impressions at a screen. All impression durations are squared and added together, and then the square root of all the summation is divided by the total number of impressions.

The engagement index gives us the ability to compare the ability of different screens and networks in holding the attention of the audience.

Both of these indices can be calculated at different levels—screen, site, network, etc. They can also be used to analyze the changes in reach and engagement over time. The indices can also be drilled down—e.g., we can calculate the engagement index for a given demographic group at a given time of day.

Figure 13:
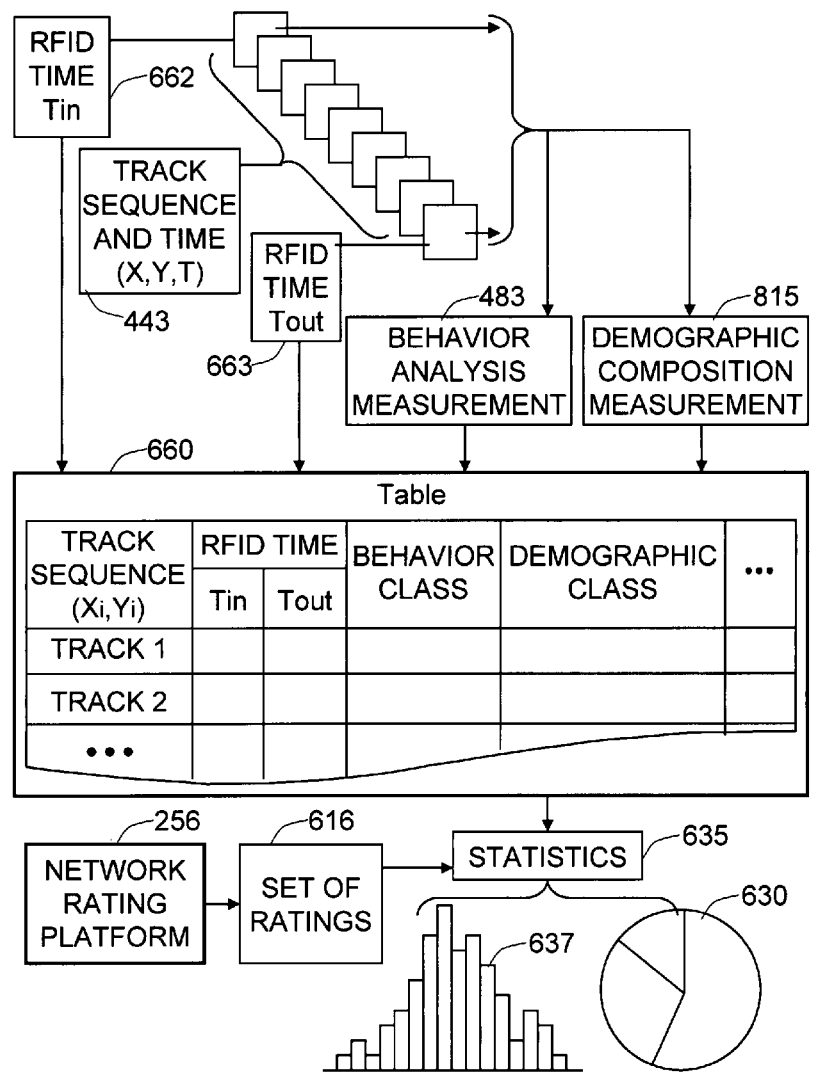
FIG. 13 shows an exemplary data storage process in an exemplary embodiment of the present invention.

FIG. 13 shows an exemplary data storage process in an exemplary embodiment of the present invention. In the exemplary embodiment, the system can store the data in a table 660, where each track has fields of values: exemplary attributes can be time stamps (start time and end time of the video-based tracking sequence 443, associated RFID Tin and Tout for person appearance and disappearance in a particular section), behavior class by the behavior analysis measurement 483 process, demographic class by the demographic composition measurement 815 process, and so on. The set of ratings 616 produced by the network rating platform 256 can also be stored into a statistics in an exemplary embodiment of the present invention.

The exemplary data can be used to collect statistics 635 of the behavior analysis and demographic composition of the customers, and the statistics 635 can be represented as a pie chart 630, as a bar graph 637, or any data representation means in the exemplary embodiment.

The data is accessible by the programming module, so that the system can directly and automatically utilize the statistical data for the characterization of the sections in the retail space.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for calculating a set of media effectiveness ratings for a plurality of out-of-home media presentations, comprising the following steps:

(a) presenting, by a digital media network, an out-of-home media presentation (b) capturing, by a plurality of vision processing units operating in coordination with a central server, a plurality of input images of people in the vicinity of the out-of-home media presentation, wherein each vision processing unit comprises a means for controlling, means for processing, means for video interface, and a plurality of means for capturing images, (c) determining, by the plurality of vision processing units operating in coordination with a central server, path data of each person in the vicinity of the out-of-home media presentation including initial point, destination point, global trip, trip time, dwell time and average velocity, (d) determining, by the plurality of vision processing units operating in coordination with a central server, behavior data including an amount of time each person in the vicinity of the out-of-home media presentation spends viewing and not viewing the out-of-home media presentation while in the vicinity of the out-of-home media presentation, (e) determining, by the plurality of vision processing units operating in coordination with a central server, estimated demographic data of each person in the vicinity of the out-of-home media presentation including gender, age and ethnicity by applying at least a computer vision based demographic classification algorithm to the plurality of input images of the people in the vicinity of the out-of-home media presentation, (f) aggregating, by the central server, total characteristic data of the out-of-home media presentation including the path data, the behavior data and the estimated demographic data of each person in the vicinity of the out-of-home media presentation based on one or more visits of each person to a predefined area in the vicinity of the out-of-home media presentation (g) calculating, by the central server, the set of media effectiveness ratings including opportunity to see, gross rating points, cost per thousand gross impressions, engagement and impression duration based on the total characteristic data of the out-of-home media presentation,
(h) repeating steps (a) thru (g) for one or more additional out-of-home media presentations
(i) comparing, by the central server, the respective set of media effectiveness ratings of each of the out-of-home media presentations.

2. The method according to claim 1, wherein the method further comprises steps of:
   (a) modeling the audience composition changes with time based on the total characteristic data of the out-of-home media presentation,
   (b) calculating an approximate prediction of the type of audience expected in the vicinity of the out-of-home media presentation at a given time, and
   (c) dynamically changing content of the out-of-home media presentation according to the approximate prediction of audience segment.

3. The method according to claim 1, further comprising collecting data including an actual count of the people present in the vicinity or a proxy, including a count of transactions and door count, a count of the people who notice the media, durations in which the people notice the media and a segmentation of the people who notice the media.

4. The method according to claim 1, further comprising combining a play log of advertisement with the total characteristic data of the out-of-home media presentation to measure the impact of the media.

5. The method according to claim 1, further comprising determining opportunity to see, total audience traffic, the size of the unique audience in a given time period, gross rating points, target rating points, cost per thousand impressions, and return on investment based on total characteristic data of the out-of-home media presentation.

6. The method according to claim 1, further comprising analyzing and extracting the total characteristic data of the out-of-home media presentation by a rule application logic module whereby the rule application logic module enables dynamic and structured adjustment in the analyzing and extracting of the total characteristic data of the out-of-home media presentation.

7. The method according to claim 1, further comprising representing the set of media effectiveness ratings with layers of information, wherein the set of media effectiveness ratings comprises opportunity to see, total audience traffic, the size of the unique audience in a given time period, gross rating points, target rating points, cost per thousand impressions, and return on investment based on the total characteristic data of the out-of-home media presentation.

8. The method according to claim 1, further comprising taking samples from the people for determining total characteristic data of the out-of-home media presentation.

9. A system for calculating a set of media effectiveness ratings for a plurality of out-of-home media presentations, comprising a digital media network and a plurality of vision processing units wherein each vision processing unit comprises a means for controlling, means for processing, means for video interface, and a plurality of means for capturing images, operating in coordination with a central server executing the following steps:
   (a) presenting, by a digital media network, an out-of-home media presentation
   (b) capturing, by a plurality of vision processing units operating in coordination with a central server, a plurality of input images of people in the vicinity of the out-of-home media presentation
   (c) determining, by the plurality of vision processing units operating in coordination with a central server, path data of each person in the vicinity of the out-of-home media presentation including initial point, destination point, global trip, trip time, dwell time and average velocity,
   (d) determining, by the plurality of vision processing units operating in coordination with a central server, behavior data including an amount of time each person in the vicinity of the out-of-home media presentation spends viewing and not viewing the out-of-home media presentation while in the vicinity of the out-of-home media presentation,
   (e) determining, by the plurality of vision processing units operating in coordination with a central server, estimated demographic data of each person in the vicinity of the out-of-home media presentation including gender, age and ethnicity by applying at least a computer vision based demographic classification algorithm to the plurality of input images of the people in the vicinity of the out-of-home media presentation,
   (f) aggregating, by the central server, total characteristic data of the out-of-home media presentation including the path data, the behavior data and the estimated demographic data of each person in the vicinity of the out-of-home media presentation based on one or more visits of each person to a predefined area in the vicinity of the out-of-home media presentation
   (g) calculating, by the central server, the set of media effectiveness ratings including opportunity to see, gross rating points, cost per thousand gross impressions, engagement and impression duration based on the total characteristic data of the out-of-home media presentation,
   (h) repeating steps (a) thru (g) for one or more additional out-of-home media presentations
   (i) comparing, by the central server, the respective set of media effectiveness ratings of each of the out-of-home media presentations.

10. The system according to claim 9, further comprising:
    (a) modeling the audience composition changes with time based on the total characteristic data of the out-of-home media presentation,
    (b) calculating an approximate prediction of the type of audience expected in the vicinity of the out-of-home media presentation at a given time, and
    (c) dynamically changing content of the out-of-home media presentation according to the approximate prediction of audience segment.

11. The system according to claim 9, further comprising collecting data including an actual count of the people present in the vicinity or a proxy, including a count of transactions and door count, a count of the people who notice the media, durations in which the people notice the media and a segmentation of the people who notice the media.

12. The system according to claim 9, further comprising combining a play log of advertisement with the total characteristic data of the out-of-home media presentation to measure the impact of the media.

13. The system according to claim 9, further comprising determining opportunity to see, total audience traffic, the size of the unique audience in a given time period, gross rating points, target rating points, cost per thousand impressions, and return on investment based on total characteristic data of the out-of-home media presentation.

14. The system according to claim 9, further comprising analyzing and extracting the total characteristic data of the out-of-home media presentation by a rule application logic module whereby the rule application logic module enables dynamic and structured adjustment in the analyzing and extracting of the total characteristic data of the out-of-home media presentation.

15. The system according to claim 9, further comprising representing the set of media effectiveness ratings with layers of information, wherein the set of media effectiveness ratings comprises opportunity to see, total audience traffic, the size of the unique audience in a given time period, gross rating points, target rating points, cost per thousand impressions, and return on investment based on the total characteristic data of the out-of-home media presentation.

16. The system according to claim 9, further comprising taking samples from the people for determining total characteristic data of the out-of-home media presentation.

* * * * *